United States Patent
Qi et al.

(10) Patent No.: US 9,042,889 B2
(45) Date of Patent: May 26, 2015

(54) METHOD AND APPARATUS FOR SELECTING WIRELESS COMMUNICATION SYSTEMS

(75) Inventors: Wei Qi, San Diego, CA (US); Arvind Swaminathan, San Diego, CA (US); Manasi D. Gandhi, San Diego, CA (US); James A. Hutchison, IV, San Diego, CA (US); Kishore Srirambhatla, San Diego, CA (US); Reza Shahidi, San Diego, CA (US); Alok Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 852 days.

(21) Appl. No.: 12/874,018

(22) Filed: Sep. 1, 2010

(65) Prior Publication Data
US 2011/0212722 A1 Sep. 1, 2011

Related U.S. Application Data

(60) Provisional application No. 61/244,814, filed on Sep. 22, 2009.

(51) Int. Cl.
*H04W 36/30* (2009.01)
*H04W 80/04* (2009.01)
*H04W 48/16* (2009.01)
*H04W 48/18* (2009.01)

(52) U.S. Cl.
CPC .................................... *H04W 48/18* (2013.01)

(58) Field of Classification Search
USPC ......................................................... 455/434
See application file for complete search history.

(56) References Cited

U.S. PATENT DOCUMENTS

| | | | |
|---|---|---|---|
| 2003/0134637 A1 | 7/2003 | Cooper | |
| 2004/0203784 A1 | 10/2004 | Sasaki et al. | |
| 2008/0076434 A1 | 3/2008 | Shigaki et al. | |
| 2008/0227453 A1* | 9/2008 | Somasundaram et al. | .... 455/436 |

(Continued)

FOREIGN PATENT DOCUMENTS

| | | |
|---|---|---|
| CN | 1460388 A | 12/2003 |
| CN | 1765100 A | 4/2006 |
| CN | 1902976 A | 1/2007 |

(Continued)

OTHER PUBLICATIONS

International Search Report and Written Opinion—PCT/US2010/049883—International Search Authority, European Patent Office, Jan. 18, 2011.

(Continued)

*Primary Examiner* — Vladimir Magloire
*Assistant Examiner* — Natasha Cosme
(74) *Attorney, Agent, or Firm* — Fariba Yadegar-Bandari

(57) ABSTRACT

Methods and apparatuses are provided that facilitate avoiding one or more wireless communication systems based at least in part on determining a level of unreliability of a reverse link channel related to a system. This can be based at least in part on determining whether the system can be accessed over the reverse link channel. If not, the wireless communication system can be avoided to conserve power utilized to perform such access attempts. Where the unreliability is temporary, however, some access attempts can be performed for systems of higher priority than a current system during the period of avoidance of one or more higher priority systems.

46 Claims, 13 Drawing Sheets

(56) References Cited

U.S. PATENT DOCUMENTS

2010/0124919 A1* 5/2010 Ko et al. .................. 455/424
2011/0070869 A1* 3/2011 Ryu ...................... 455/412.1

FOREIGN PATENT DOCUMENTS

| CN | 101150859 A | 3/2008 |
| JP | 2002539733 A | 11/2002 |
| JP | 2003153325 A | 5/2003 |
| JP | 2007511142 A | 4/2007 |
| JP | 2008079079 A | 4/2008 |
| JP | 2009130918 A | 6/2009 |
| JP | 2009524972 A | 7/2009 |
| WO | 0056103 A1 | 9/2000 |
| WO | 02082845 A1 | 10/2002 |
| WO | WO2004073277 A1 | 8/2004 |
| WO | WO2005048630 A1 | 5/2005 |
| WO | 2007086679 A1 | 8/2007 |

OTHER PUBLICATIONS

Recommended System Selection Requirements for 1X and 1xEVDO- Capable Terminals CDMA Development Group Mar. 15, 2007 , XP002599308 Retrieved from the Internet: URL:http://wiki.cdg.org/w/images/6/6e/143v1.1 .doc [retrieved on Sep. 2, 2010].
Taiwan Search Report—TW099132229—TIPO—Jun. 4, 2013.
3GPP2: "cdma2000 High Rate Packet Data Air Interface Specification", C.S0024-A, Version 3.0, Sep. 2006, 1164 pages.

* cited by examiner

METHOD AND APPARATUS FOR SELECTING WIRELESS COMMUNICATION SYSTEMS

CLAIM OF PRIORITY UNDER 35 U.S.C. §119

The present application for patent claims priority to Provisional Application No. 61/244,814 entitled "SYSTEM SELECTION ALGORITHM" filed Sep. 22, 2009, and assigned to the assignee hereof and hereby expressly incorporated by reference herein.

BACKGROUND

1. Field

The following description relates generally to wireless communications, and more particularly to selecting wireless communication systems.

2. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP long term evolution (LTE), ultra mobile broadband (UMB), evolution data optimized (EV-DO), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

In addition, devices in a wireless network can select wireless communication systems for receiving access to the wireless network. For example, a device, while communicating with an base station, can perform reselection to one or more disparate base stations (e.g., where the device is moving and the one or more disparate base stations is more preferred and/or transmit a clearer signal). Moreover, in an example, a device can reselect to an base station related to a disparate wireless communication system. This can occur, for example, where the original base station becomes unreliable or inaccessible, and there are no other base stations related to the wireless communication system that are reliable and/or accessible. In another example, this can occur, upon detecting an base station of a more preferred wireless communication system.

Furthermore, where the original base station becomes unreliable in the example above, the device can place the base station or related wireless communication system in an avoidance list and can avoid connection to the wireless communication system for a specified time. Thus, during a reselection procedure, the device can scan for systems other than those enumerated in the avoidance list to conserve power utilized by the device. When the specified time is reached, the base station or related wireless communication system can be removed from the avoidance list, and thus access is attempted thereto during the next reselection procedure if a corresponding base station is within range.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more embodiments and corresponding disclosure thereof, various aspects are described in connection with facilitating determining a level of unreliability related to a wireless communication system. In this regard, the wireless communication system can be avoided based at least in part on the level of unreliability to balance a number of access attempts with the chance that the system can be accessed. Where a preferred wireless communication system is determined to be temporarily unreliable, for example, access can be attempted to the wireless communication system more frequently than if the system is determined to be persistently unreliable.

According to an example, a method is provided that includes receiving communications from a system over a forward link channel and determining a level of unreliability related to a reverse link channel of the system. The method further includes avoiding the system according to one or more timers based at least in part on the level of unreliability.

In another aspect, an apparatus for avoiding systems is provided that includes at least one processor configured to receive one or more signals from a system over a forward link channel and discern a level of unreliability related to reverse link channel of the system as temporary or persistent. The at least one processor is further configured to avoid the system during one or more reselection procedures based at least in part on a timer and the level of unreliability. In addition, the wireless communications apparatus includes a memory coupled to the at least one processor.

In yet another aspect, an apparatus for providing system avoidance is provided that includes means for receiving communications from a system over a forward link channel and means for determining a level of unreliability related to a reverse link channel of the system. The apparatus further includes means for avoiding the system according to a timer based at least in part on the level of unreliability.

Still, in another aspect, a computer-program product is provided for avoiding systems that includes a computer-readable medium having code for causing at least one computer to receive one or more signals from a system over a forward link channel and code for causing the at least one computer to discern a level of unreliability related to reverse link channel of the system. The computer-readable medium further includes code for causing the at least one computer to avoid the system during one or more reselection procedures based at least in part on a timer and the level of unreliability.

Moreover, in an aspect, an apparatus for system avoidance is provided that includes a base station detecting component for receiving communications from a system over a forward link channel and a reliability determining component for discerning a level of unreliability related to a reverse link channel of the system. The apparatus further includes a system connecting component for avoiding the system according to a timer based at least in part on the level of unreliability.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
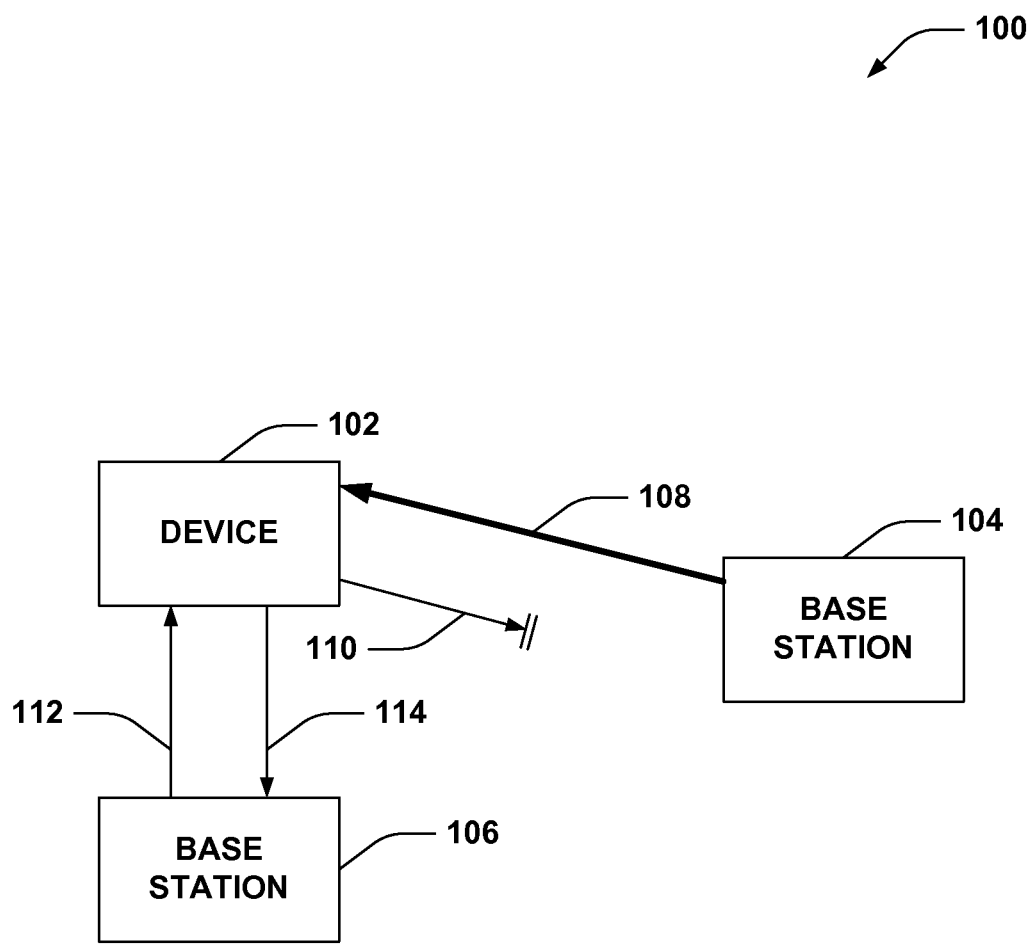
FIG. 1 illustrates an example system for selecting wireless communication systems that have reliable reverse link channels.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

As described further herein, a device can determine that a reverse link to a wireless communications system is unreliable, and can also determine whether the unreliability is temporary or persistent. Where the unreliability is persistent, for example, the device can avoid the wireless communication system for a longer amount of time than if temporary. To determine whether the unreliability is temporary or persistent, for example, the device can make various access attempts to the wireless communication system. If the access attempts continue to fail, the device can determine the unreliability is persistent (e.g., after a threshold number of attempts), can avoid the wireless communication system, and can communicate on another wireless communication system, if available. If the avoided wireless communication system is a more preferred wireless communication system, however, the device can continue to attempt access according to a disparate timer, and can reselect to the more preferred wireless communications system where the access attempt is successful.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, evolved Node B (eNB), or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring to FIG. 1, illustrated is a wireless communication system 100 for selecting from multiple wireless communication systems. System 100 includes a device 102 that receives wireless network access from one or more base stations, such as base stations 104 and/or 106, or other devices. Device 102 can be a UE or other mobile device, a relay node, an access point, and/or the like. Base stations 104 and 106 can similarly be UEs (e.g., in peer-to-peer or ad-hoc mode), relay nodes, access points, etc., where base station 104 or 106 provides device 102 with access to a wireless network (not shown). In addition, device 102 can receive signals over forward link channel 108 and/or 112 from base station 104 and/or 106, and can attempt to communicate over reverse link channel 110 and/or 114 with base station 104 and/or 106, for example.

According to an example, device 102 can receive signals from base station 104 over a forward link channel 108, and can attempt to communicate back to base station 104 over reverse link channel 110. Reverse link channel 110, however, can be unreliable such that it does not allow for accessing base station 104. This can be for a variety of reasons, such as base station 104 is too far away to receive signals from device 102 (e.g., it can only transmit over forward link channel 108 to device 102), channel conditions related to reverse link channel 110 are below a threshold required to maintain a reliable connection, and/or the like, for example. In one example, base station 104 can be at a higher elevation than device 102 such that forward link channel 108 signals can be very strong, and thus device 102 can hear the signals over forward link channel 108, though it is too far away to communicate over reverse link channel 110 to close the communication loop.

Thus, device 102 can attempt accessing base station 104 over reverse link channel 110 and can fail. For example, device 102 can avoid base station 104, a related wireless communication system, a related channel, etc. for a duration of time, and can attempt access to another base station, which can be of a disparate system and/or utilize a different channel, such as base station 106. In one example, device 102 can add base station 104 to an avoidance list and initialize an avoidance timer. In this regard, device 102 can search for other base stations without searching base station 104, base stations of a similar wireless communication type, base stations that utilize a same channel for communicating, and/or the like. Once the avoidance timer expires, device 102 can then search for base station 104, etc.

In an example, however, base station 104 can be preferred over base station 106 (e.g., base station 104 can be affiliated with a home wireless communication system of device 102, can offer enhanced services to device 102, increased bandwidth to device 102, and/or the like). In addition, for example, it is to be appreciated that unreliability of reverse link 108 can be temporary. Thus, for example, device 102 can attempt to access base station 104 or another base station on the same wireless communication system or using the same channel during the avoidance period as well. In one example, device 102 can attempt to access base station 104 or another base station of the same wireless communication system or channel upon determining to avoid base station 104, at various times during a reselection procedure with one or more disparate base stations, according to a reselection timer, and/or the like.

In other examples, base station 104 can balance reverse link channel 110 and forward link channel 108 to allow device 102 to transmit over resources relative to the power of forward link 108 at device 102. Moreover, for example, base station 104 can force device 102 to perform registration after acquiring base station 104 over forward link channel 108. This, for example, can cause registration to fail where the reverse link channel 110 is unreliable, which can cause device 102 to attempt reselection to other base stations (e.g., base station 106). In yet another example, base station 106 can be modified to operate at the same priority as base station 104 relative to device 102 in areas where base station 104 has a strong forward link channel 108 and an unreliable reverse link channel 110.

Figure 2:
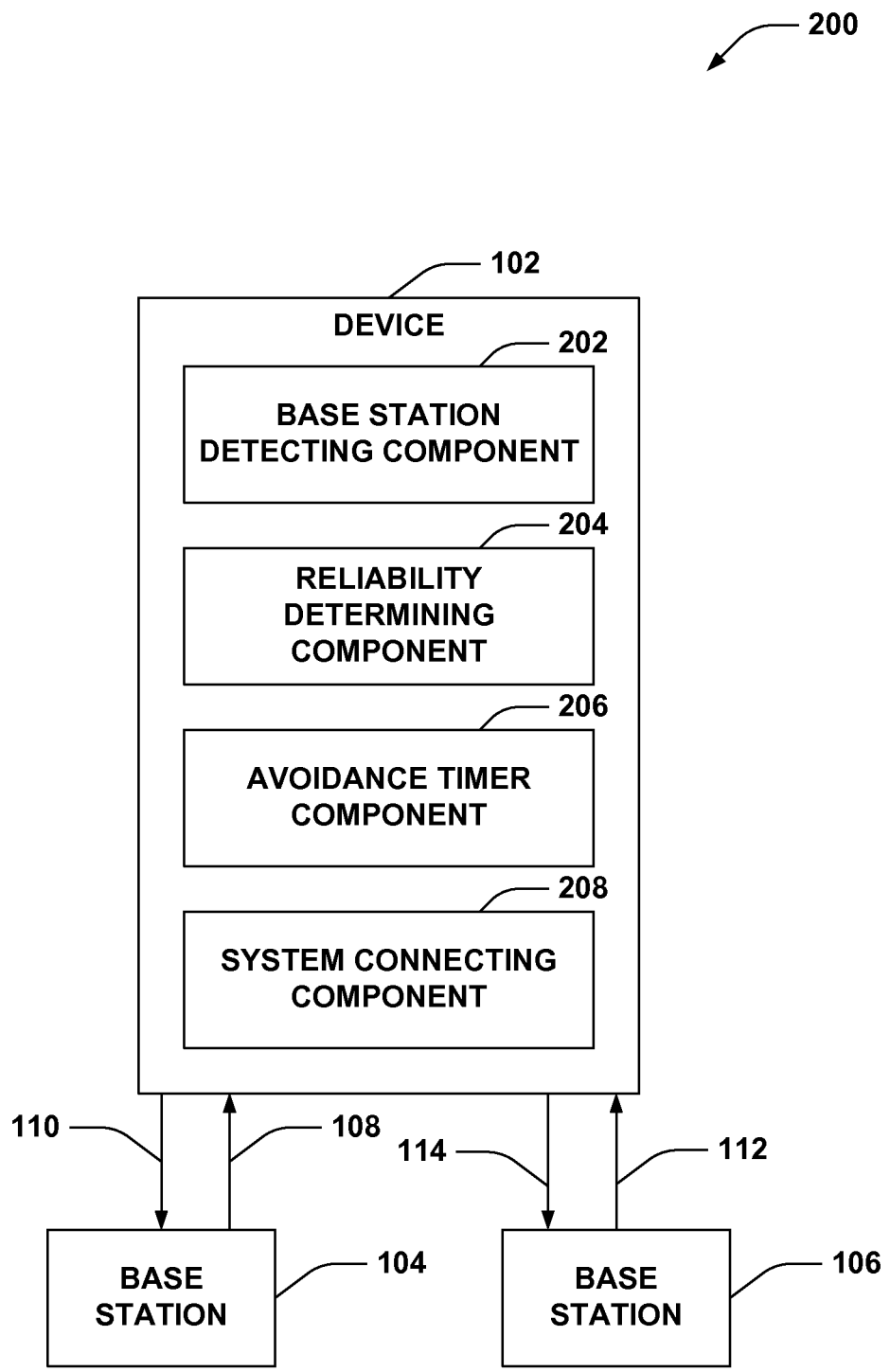
FIG. 2 illustrates an example system for avoiding wireless communication systems according to reverse link unreliability.

Turning to FIG. 2, illustrated is an example wireless communications system 200 that determines avoidance procedures for a reverse link challenged base station. System 200 can include device 102, which can communicate with base stations 104 and/or 106 over forward links 108 and/or 112 and reverse links 110 and/or 114, as described above. In addition, as described, base stations 104 and 106 can relate to different wireless communication systems. Device 102 can comprise a base station detecting component 202 that can receive forward link channel signals from one or more base stations, and a reliability determining component 204 that determines whether a level of reliability of a reverse link channel related to the base station. Device 102 also comprises an avoidance timer component 206 that initializes an avoidance timer upon determining that a reverse link with the base station cannot be established or has a certain level of unreliability and a system connecting component 208 that attempts access to the one or more base stations.

According to an example, base station detecting component 202 can determine one or more base stations within range of device 102 (e.g., based at least in part on measuring signals from the base stations, etc.), such as base stations 104 and 106. In addition, for example, base station detecting component 202 can measure the signals as part of device 102 powering on or otherwise initializing communications, as part of reselection, and/or the like. Reliability determining component 204, for example, can determine a level of unreliability related to a reverse link channel of the one or more base stations (e.g., whether the unreliability is temporary or persistent). As described, for example, base station detecting component 202 can measure a forward link channel 108 of base station 104 and can determine that the signal is strong enough (e.g., signal-to-noise ratio (SNR) at or above a threshold level) to serve device 102. Thus, reliability determining component 204 can transmit signals over a reverse link channel 110 to determine a related level of unreliability.

For example, device 102, or reliability determining component 204, can initiate a maximum access probe (MAP) procedure where it transmits to base station 104 over a reverse link channel multiple times at increasing power until it connects or until a threshold power is reached; in this example, the threshold power can be reached with no access to base station 104. It is to be appreciated that device 102 can determine whether it is connected to base station 104 based at least in part on receiving a response to signals transmitted during the MAP procedure, and reliability determining component 204, in this example, can discern whether reverse link channel 110 is sufficiently reliable to continue communicating with base station 104 (e.g., based on control data received from base station 104). In one example, however, MAP can fail, which can be referred to as MAP exit (MAPE), in which case reliability determining component 204 can discern that the reverse link channel is unreliable.

In either example (e.g., whether reverse link channel 110 is determined to be insufficient for communicating with base station 104 or whether MAPE occurs), reliability determining component 204 can determine a level of unreliability related to reverse link channel 110 (e.g., whether the unreliability is temporary or persistent). In one example, reliability determining component 204 can first assume the reverse link channel 108 issues are persistent pending further access attempts. Thus, for example, system connecting component 208 can add base station 104 to an avoidance list based on reliability determining component 204 discerning the unreliability, and avoidance timer component 206 can initialize an associated timer for avoiding base station 104 and/or base stations of a similar wireless communication system and/or using a similar channel. System connecting component 208 can perform various procedures to attempt access to base station 104 or 106 and/or other base stations (e.g., reselection procedures).

It is to be appreciated, however, that base station 104 can be of a preferred wireless communication system, as compared to other base stations in the area, such as base station 106. In this regard, reliability determining component 204 can determine whether radio link channel failure at base station 104 is temporary or persistent based at least in part on whether system connecting component 208 can access or connect to base station 104 during or based on one or more procedures performed for acquiring and/or attempting access to other base stations and/or the like. For example, system connecting component 208, or one or more disparate components, performs such acquisitions/access attempts even though reliability determining component 204 placed base station 104 and/or its related wireless communication system in an avoidance list.

Following a threshold number of access attempts by system connecting component 208, for example, reliability determining component 204 can determine that the reverse link channel 110 failures are persistent, and can system connecting component 208 can avoid attempting acquisition of base station 104 for a longer period of time. This can be based at least in part on, for example, the avoidance timer, another timer initialized by avoidance timer component 206 for avoiding base station 104, etc. Similarly, where no other base stations are within range for the same wireless communication system, system connecting component 208 can avoid any base stations of the wireless communication system for the longer configured period of time.

Figure 3:
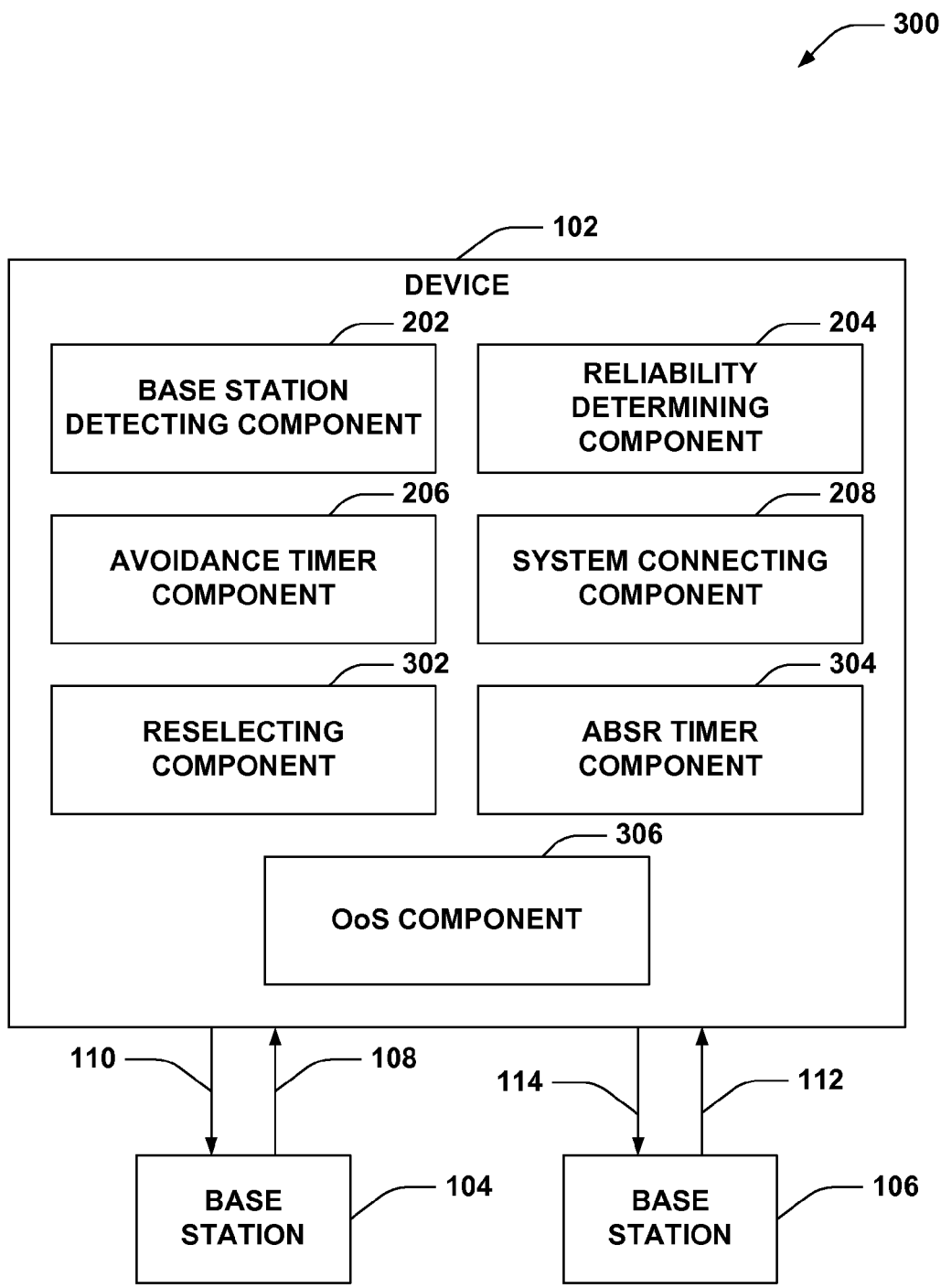
FIG. 3 illustrates an example system that facilitates avoiding wireless communication systems based on whether a reverse link channel is determined to be temporarily or persistently unreliable.

Referring to FIG. 3, an example wireless communications system 300 is shown that determines whether failure or unreliability of a reverse link channel is temporary or persistent. System 300 can include device 102, which can communicate with base stations 104 and/or 106 over forward links 108 and/or 112 and attempt communication over reverse links 110 and/or 114, as described above. In addition, as described, base stations 104 and 106 can relate to different wireless communication systems.

Device 102 can comprise a base station detecting component 202 that can locate one or more base stations for attempting connection to, and a reliability determining component 204 that determines a level of unreliability related to a reverse link channel of the one or more base stations. Device 102 also comprises an avoidance timer component 206 that initializes a timer upon determining that a reverse link with the base station cannot be established or is unreliable, a system connecting component 208 that establishes a connection to one or more base stations, and a reselecting component 302 that attempts reselection to one or more base stations. Device 102 additionally comprises an ABSR timer component 304 that initializes an ABSR timer for attempting access to avoided systems and an out-of-service (OoS) component 306 that performs one or more OoS procedures to attempt locating other base stations in range.

According to an example, as described, base station detecting component 202 can determine one or more base stations within range of device 102, such as base stations 104 and 106, and reliability determining component 204 can determine whether at least one of the one or more base stations has a reliable reverse link channel. In one example, base station detecting component 202 can determine base station 104 is of a desired wireless communication system and/or that forward link channel 108 is of a sufficient quality to communicate with base station 104. Reliability determining component 204, however, can determine that the reverse link channel 110 is unreliable and/or a level of unreliability (e.g., based at least in part on experiencing MAPE), as described.

In this case, as described, reliability determining component 204 can determine whether issues with the reverse link channel 110 are temporary or persistent. In one example, reliability determining component 204 can first assume the reverse link channel 108 issues are temporary pending further access attempts by system connecting component 208, as described. Thus, for example, reliability determining component 204 can add base station 104 to an avoidance list, and avoidance timer component 206 can initialize an associated timer for avoiding base station 104 and/or base stations of a similar wireless communication system and/or using a similar channel. For example, avoidance timer component 206 can initialize the timer based at least in part on a hardcoded, configured, or other static value, based at least in part on historical attempts to access the wireless communication system (e.g., a time value related to eventually gaining access after experiencing MADE, etc.), and/or the like.

It is to be appreciated, however, that base station 104 can be of a preferred wireless communication system, as compared to other base stations in the area, such as base station 106. In this regard, as described, system connecting component 208 can attempt to access base station 104 even after reliability determining component 204 declares base station 104 to be avoided (e.g., while communicating with other base stations of lower priority wireless communication systems, initializing such communications, and/or the like). Thus, in one example, reselecting component 302 can consider systems in the avoidance list in attempting to reselect to one or more base stations, where the systems are of a same or higher priority than the current wireless communication system. In one example, reselecting component 302 can perform an optimized silent redial (OSR) after reliability determining component 204 discerns the reverse link channel 110 unreliability, and can consider avoided systems when performing the OSR. Thus, for example, base station detecting component 202 can acquire base station 104 again, and if reliability determining component 204 discerns reverse link channel 110 is sufficient for communicating with base station 104 as part of the OSR, system connecting component 208 can determine that the previous reverse link channel 110 failure was temporary, and can attempt access to base station 104. Where access is granted, for example, the avoidance timer component 206 can stop the avoidance timer.

In another example, where reliability determining component 204 discerns reverse link channel 110 is insufficient for communicating with base station 104 during the OSR, avoidance timer component 206 can continue tolling the associated avoidance timer for base station 104, and base station detecting component 202 can evaluate other wireless communication systems. For example, base station detecting component 202 can acquire base station 106, and reliability determining component 204 can measure reverse link channel 114 and determine it is sufficient for communicating with base station 106. In this example, system connecting component 208 can access base station 106. In either case, avoidance timer component 206 does not reset the avoidance timer until the timer expires and/or reselecting component 302 is able to communicate with base station 104 or another base station of the same wireless communication system. For example, reselecting component 302 can still attempt access to base station 104, since it is related to a more preferred wireless communication system, even though it is in the avoidance list, at least until reliability determining component 204 determines reverse link channel 110 issues are persistent.

Thus, in an example, reselecting component 302 can perform a better service reselection (BSR) to determine whether base stations of more preferred wireless communication systems are within range (e.g., while having an established connection with base station 106). Where a system or related base station is in the avoidance list, such as the wireless communication system of base station 104, reselecting component 302 can perform an ABSR to consider the avoided system as well. In this regard, for example, base station detecting component 202 can acquire base station 104, as described, and reliability determining component 204 can discern whether reverse link channel 110 is reliable, as described. If so, system connecting component 208 can attempt access to base station 104. If not, avoidance timer component 206 continues to toll the avoidance timer.

Moreover, where reliability determining component 204 deems the reverse link channel is unreliable, ABSR timer component 304 initializes an ABSR timer for performing a next ABSR. It is to be appreciated that ABSR timer component 304 can initialize the ABSR timer to a value such that reselecting component 302 can perform multiple ABSRs, without reselecting to the avoided system, before performing another BSR. In this regard, for example, device 102 can also utilize a BSR timer that has an initialized value greater than that of the ABSR timer. In another example, reselecting component 302 can determine a configured number of ABSR attempts per BSR attempt, and ABSR timer component 304 can discern the ABSR timer initialization value according to the number of ABSR attempts and the BSR timer value. In addition, for example, reselecting component 302 can manage a counter of ABSR attempts per system, base station, or channel, and can decrement the counter after each attempt to conform to the number of determined ABSR attempts. In another example, ABSR timer component 304 can initialize the ABSR timer based at least in part on one or more events, such as reselecting component 302 reselecting to a less preferred system, device 102 releasing a call, device 102 acquiring limited services from the less preferred system, and/or the like.

Moreover, a number of total ABSR attempts can be determined by reselecting component 302 (e.g., based on a configuration, based on historical attempts to access the wireless communication system or other systems, as described above with respect to the avoidance timer, etc.). A related counter can also be decremented by reselecting component 302 for the total ABSR attempts. After the number of total ABSR attempts are reached for a certain wireless communication system and/or base station (such as base station 104), system connecting component 208 can determine reverse link channel 110 unreliability is persistent, and can avoid base station 104 and/or the related wireless communication system for the duration of the avoidance timer at avoidance timer component 206. In this regard, for example, device 102 can conserve power previously required to scan for preferred systems while still allowing device 102 to determine whether reverse link channel unreliability is only temporary for preferred systems.

Moreover, for example, where reliability determining component 204 discerns that the reverse link channel 110 is sufficiently reliable during reselection (e.g., whether OSR or ABSR), system connecting component 208 can determine whether an access will be triggered immediately at base station 104. In an example, this can include determining whether a registration is current at base station 104 and/or the wireless communication system related thereto. If not, reselecting component 302 can attempt reselection to a next highest order base station (if present), continuing to avoid the system. If so, however, system connecting component 208 can connect to the system, reliability determining component 204 can remove the system from the avoidance list, and avoidance timer component 206 can cancel the avoidance timer for the system Where reselecting component 302 cannot locate a suitable base station or related wireless communication system for reselection, OoS component 306 can perform an OoS procedure. For example, where there is a system in the avoidance list, such as the wireless communication system related to base station 104, OoS component 306 can perform an avoided OoS (AOoS) procedure, such that the avoided system can be scanned and if acquired, system connecting component 208 can attempt access therewith if the registration is current. If the registration is not current, OoS component 306 can perform an OoS procedure that does not scan for the avoided system.

Figure 4:
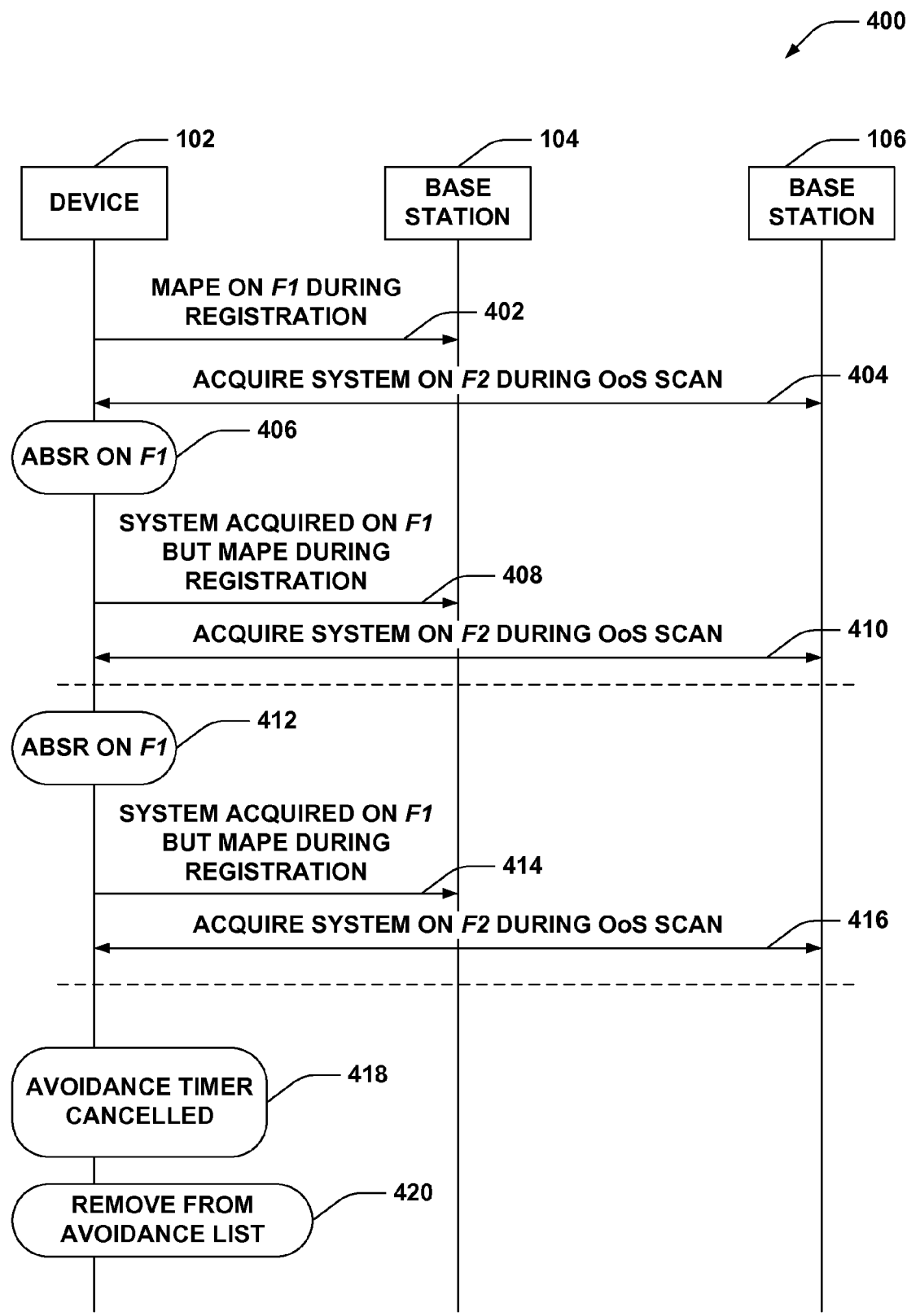
FIG. 4 illustrates an example network for avoiding wireless communication systems upon experiencing maximum access probe exit (MAPE).

Turning now to FIG. 4, depicted is an example wireless communications network 400 that allows avoided systems to be scanned during BSR. Network 400 can include a device 102 that attempts access to a base station 104 and/or 106, as described. Device 102 can receive forward link channel signals from base station 104 and can attempt to connect using a corresponding reverse link channel having frequency F1, as described. Device 102 can experience MAPE on F1 during registration 402 with base station 104. In an example, where this is an initial access attempt, device 102 can initialize an avoidance timer related to the system of base station 104 and add the system, base station 104, or a related channel to an avoidance list. Moreover, for example, device 102 can additionally experience MAPE with respect to any other base stations that might be in-range and communicate using the same system as base station 104. As described, in this example, device 102 can attempt to access another system. In this regard, device 102 can acquire a system on frequency F2 during an OoS scan 404 that utilizes base station 106. In addition, at this time, device 102 can start a BSR timer to search for a better system at some future time.

In addition, device 102 can begin an ABSR on F1 406 to determine whether base station 104, or a base station of the same system, can be accessed, since base station 104 is of higher priority than base station 106. Device 102 can acquire the avoided system on F1, but MAPE can occur during registration 408 with base station 104. In this regard, device 102 can keep the system in the avoidance list and continue to toll the timer. Device 102 can acquire a system on frequency F2 during an OoS scan 410 that utilizes base station 106. Moreover, as described, device 102 can initialize an ABSR timer that expires one or more times during the BSR timer, such that ABSR can be performed more frequently than BSR to attempt access to avoided but more preferred systems. Device 102 can begin another ABSR on F1 412 (e.g., upon expiration of the ABSR timer, and can again acquire the avoided system on F1, but MAPE can occur during registration 414 with base station 104. In this regard, device 102 can keep the system in the avoidance list and continue to toll the timer. Device 102 can again acquire a system on frequency F2 during an OoS scan 416 that utilizes base station 106.

Moreover, as described, device 102 can decrement one or more ABSR counters at each ABSR 406 and 412. Thus, once the specified number of ABSRs have been performed, device 102 can consider base station 104 and/or the related system on F1 to have persistent unreliability in the reverse link channel. Thus, device 102 can avoid the system at least until expiration of the avoidance timer. In this example, the avoidance timer can be cancelled 418. It is to be appreciated that before expiration, other BSRs can be performed for systems other than the avoided system. Following cancellation of the timer, the system can be removed from the avoidance list 420. Thus, subsequent BSRs, OoS, or similar procedures can attempt access to the previously avoided system. In addition, it is to be appreciated that similar steps can be utilized when performing OSRs as shown with respect to ABSRs above, and described in previous figures.

Figure 5:
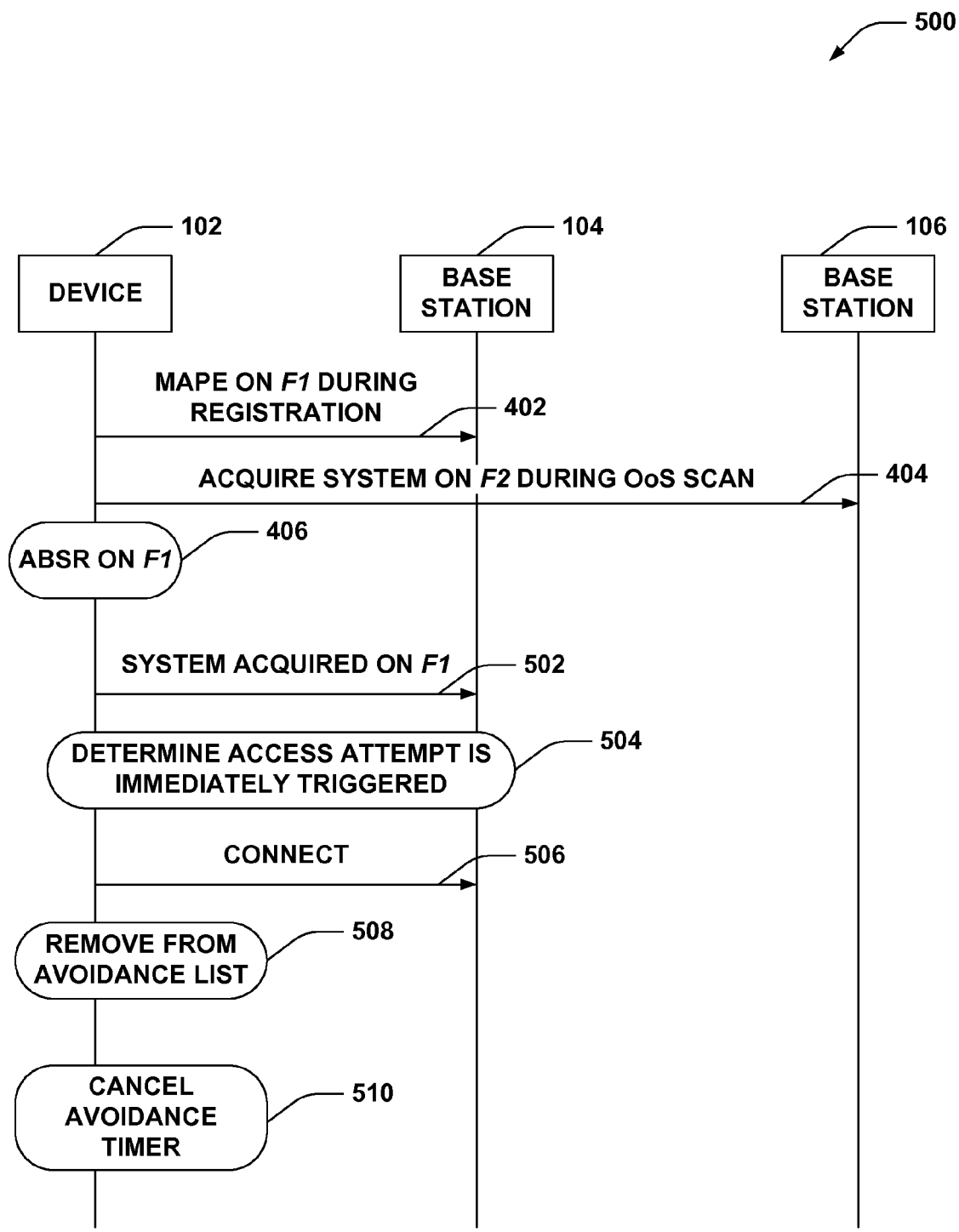
FIG. 5 illustrates an example network for connecting to an avoided wireless communication system.

Referring to FIG. 5, an example wireless communications network 500 that attempts accessing avoided systems during BSR is shown. Network 500 can include a device 102 that tries to access base station 104 and/or 106, as described. Device 102 can receive forward link channel signals from base station 104 and can attempt to connect using a corresponding reverse link channel having frequency F1, as described. Device 102 can experience MAPE on F1 during registration 402 with base station 104. In an example, where this is an initial access attempt, device 102 can initialize an avoidance timer related to the system of base station 104 and add the system, base station 104, or a related channel to an avoidance list. Moreover, for example, device 102 can additionally experience MAPE with respect to any other base stations that might be in-range and communicate using the same system as base station 104. As described, device 102 can attempt to access another system. In this regard, device 102 can acquire a system on frequency F2 during an OoS scan 404 that utilizes base station 106. In addition, at this time, device 102 can start a BSR timer to search for a better system at some time.

In addition, device 102 can begin an ABSR on F1 406 to determine whether base station 104, or a base station of the same system, can be accessed, since base station 104 is of higher priority than base station 106. Device 102 can acquire the avoided system on F1 502 (e.g., without MAPE occurring). In this regard, device 102 can determine that an access attempt can be immediately triggered 504 at base station 104 (e.g., based on registration, origination, and/or the like). Thus, device 102 can connect 506 to base station 104. Moreover, in this regard, device 102 can remove the system of base station 104 from the avoidance list 508 and can cancel the avoidance timer 510 related thereto. In addition, it is to be appreciated that similar steps can be utilized when performing OSRs as shown with respect to ABSRs above, and described in previous figures.

Figure 6:
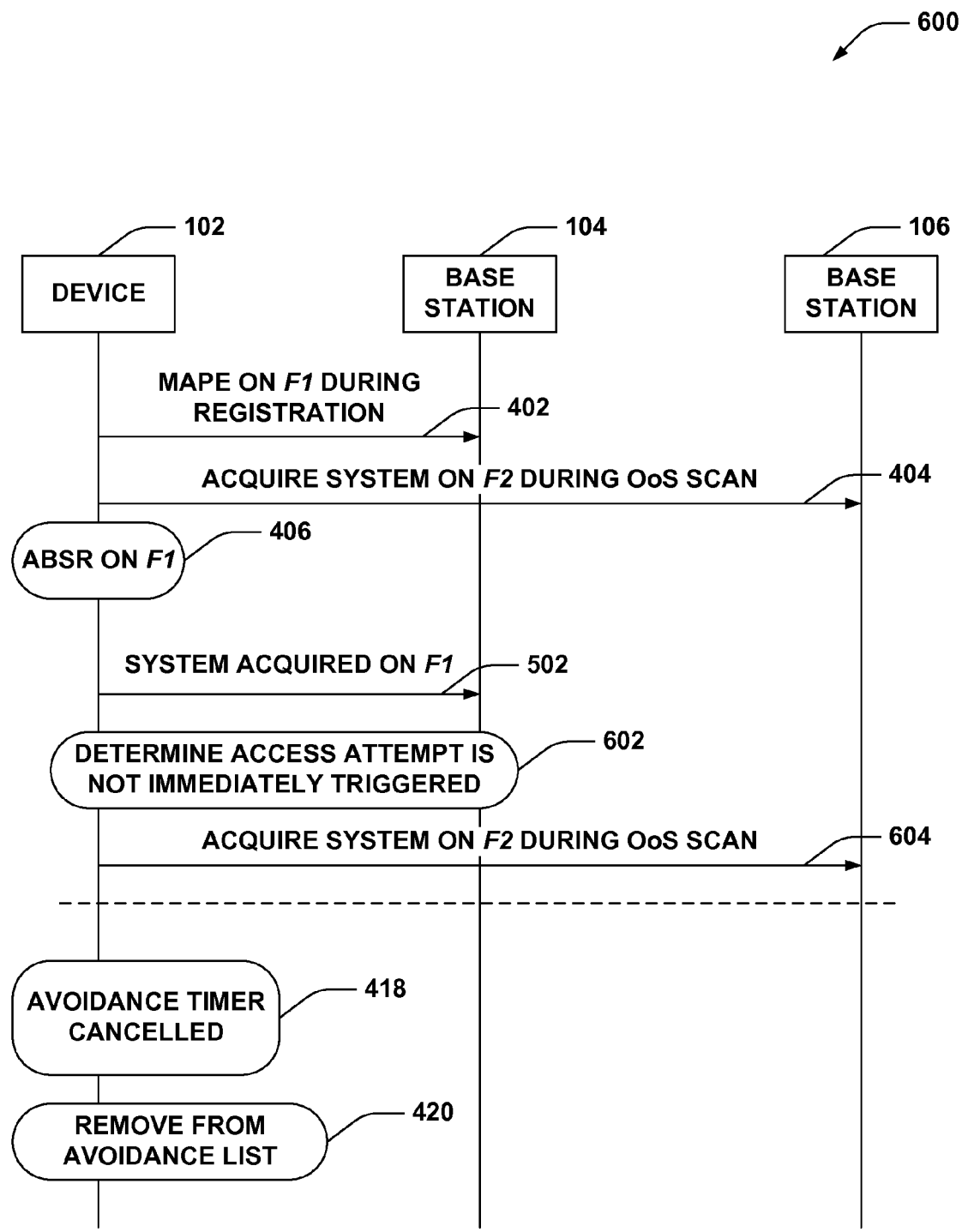
FIG. 6 illustrates an example network that avoids a wireless communication system based on determining an access attempt cannot be immediately triggered.

In reference to FIG. 6, an example wireless communications network 600 that attempts accessing avoided systems during BSR is shown. Network 600 can include a device 102 that tries to access base station 104 and/or 106, as described. Device 102 can receive forward link channel signals from base station 104 and can attempt to connect using a corresponding reverse link channel having frequency F1, as described. Device 102 can experience MAPE on F1 during registration 402 with base station 104. In an example, where this is an initial access attempt, device 102 can initialize an avoidance timer related to the system of base station 104 and add the system, base station 104, or a related channel to an avoidance list. Moreover, for example, device 102 can additionally experience MAPE with respect to any other base stations that might be in-range and communicate using the same system as base station 104. As described, device 102 can attempt to access another system. In this regard, device 102 can acquire a system on frequency F2 during an OoS scan 404 that utilizes base station 106. In addition, at this time, device 102 can start a BSR timer to search for a better system at some time.

Furthermore, device 102 can begin an ABSR on F1 406 to determine whether base station 104, or a base station of the same system, can be accessed, since base station 104 is of higher priority than base station 106. Device 102 can acquire the avoided system on F1 502 (e.g., without MAPE occurring). In this regard, device 102 can determine that an access attempt is not immediately triggered 602 at base station 104 (e.g., based on registration, origination, and/or the like). Thus, device 102 can acquire a system on frequency F2 during an OoS scan 604 that utilizes base station 106, as described above. It is to be appreciated that device can continue to toll the avoidance timer and/or perform additional ABSRs. After a period of time, device 102 can cancel the avoidance timer 418 and remove the system from the avoidance list 420, as described previously. In addition, it is to be appreciated that similar steps can be utilized when performing OSRs as shown with respect to ABSRs above, and described in previous figures.

Figure 7:
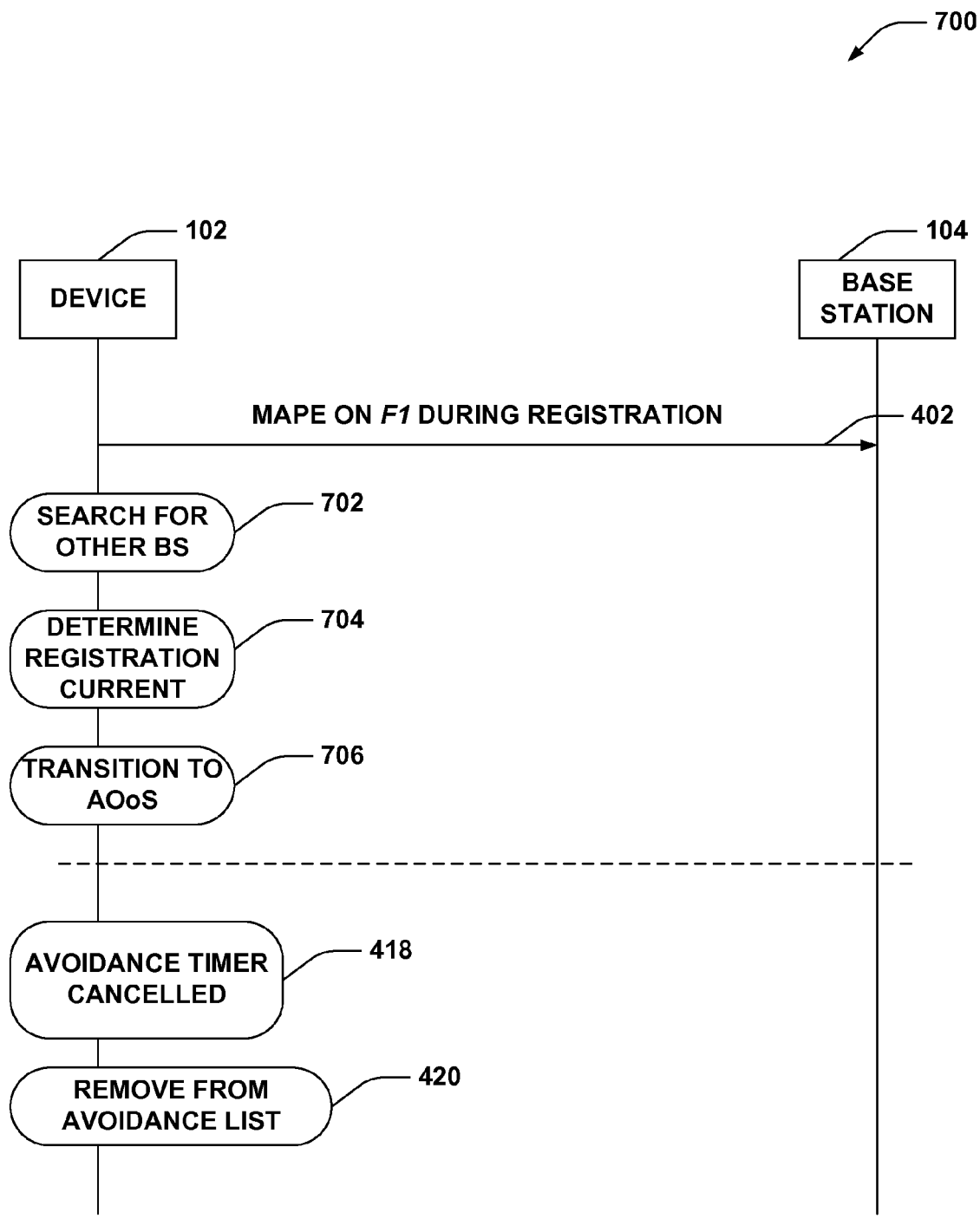
FIG. 7 illustrates an example network that facilitates initiating an avoided system out-of-service (OoS) procedure based at least in part on an unreliable reverse link channel.

Turning to FIG. 7, an example wireless communications network 700 is depicted that performs an AOoS procedure. Network 700 can include a device 102 that tries to access base station 104 and/or 106, as described. Device 102 can receive forward link channel signals from base station 104 and can attempt to connect using a corresponding reverse link channel having frequency F1, as described. Device 102 can experience MAPE on F1 during registration 402 with base station 104. In an example, where this is an initial access attempt, device 102 can initialize an avoidance timer related to the system of base station 104 and add the system, base station 104, or a related channel to an avoidance list. Moreover, for example, device 102 can additionally experience MAPE with respect to any other base stations that might be in-range and communicate using the same system as base station 104. Device 102 can then search for other one or more other base stations 702, on other systems or otherwise, and/or can attempt further access with base station 104 (e.g., in OSR, ABSR, etc.), as described. In an example, where other base stations are not found and/or access cannot be made with base station 104 for a period of time, device 102 can determine that registration with base station 104 and/or a related system is current 704, and can transition to an AOoS state 706. In this regard, device 102 can attempt access with base stations including base station 104, though it is in the avoidance list. After a period of time with no access, device 102 can cancel the avoidance timer 418 and remove the system from the avoidance list 420, as described previously.

Figure 8:
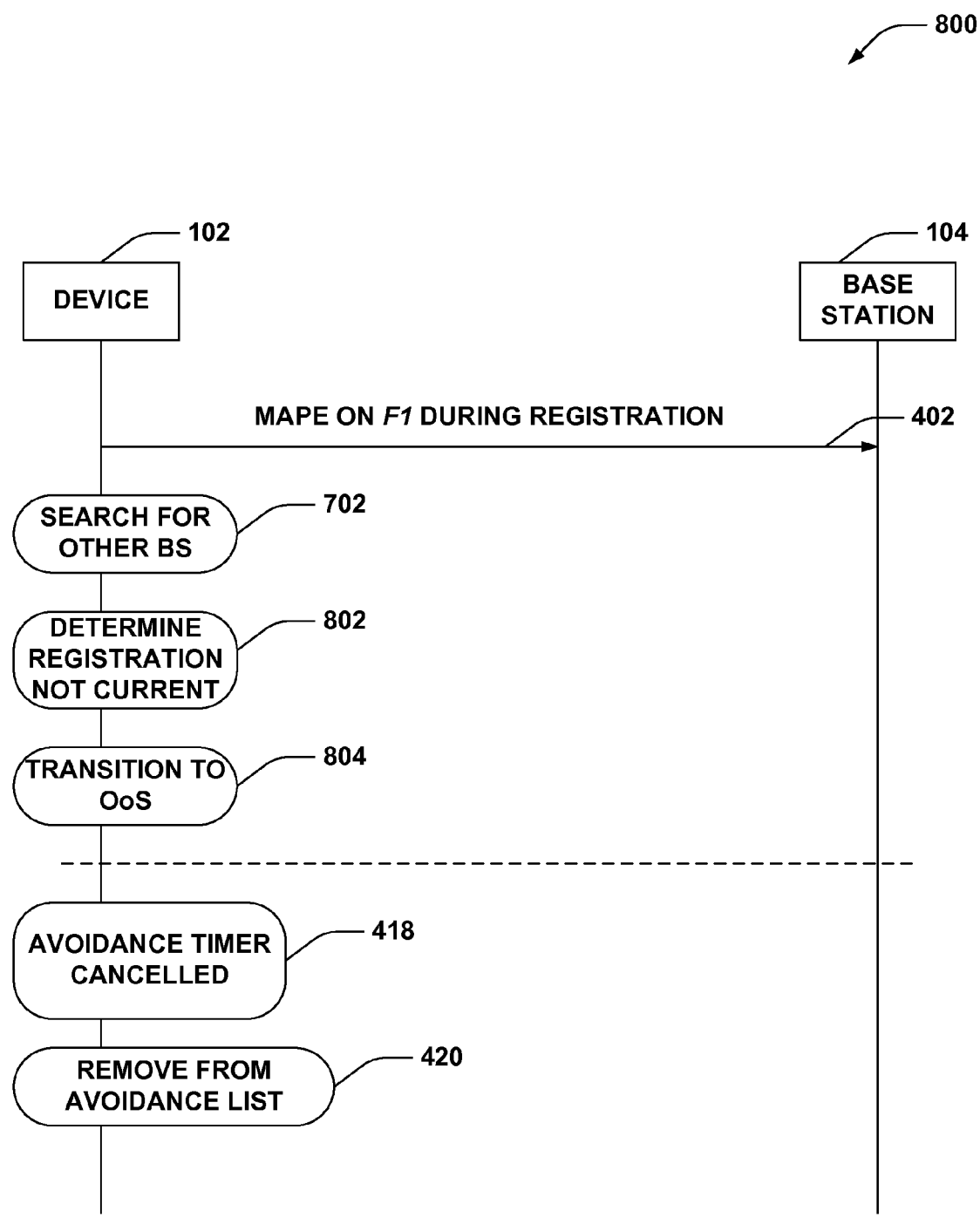
FIG. 8 illustrates an example network that initiates an OoS procedure based at least in part on an unreliable reverse link channel.

Referring to FIG. 8, an example wireless communications network 800 is illustrated for performing an OoS procedure. Network 800 can include a device 102 that tries to access base station 104 and/or 106, as described. Device 102 can receive forward link channel signals from base station 104 and can attempt to connect using a corresponding reverse link channel having frequency F1, as described. Device 102 can experience MAPE on F1 during registration 402 with base station 104. In an example, where this is an initial access attempt, device 102 can initialize an avoidance timer related to the system of base station 104 and add the system, base station 104, or a related channel to an avoidance list. Moreover, for example, device 102 can additionally experience MAPE with respect to any other base stations that might be in-range and communicate using the same system as base station 104. Device 102 can then search for other one or more other base stations 702, on other systems or otherwise, and/or can attempt further access with base station 104 (e.g., in OSR, ABSR, etc.), as described. In an example, where other base stations are not found and/or access cannot be made with base station 104 for a period of time, device 102 can determine that registration with base station 104 and/or a related system is not current 802, and can transition to an OoS state 804. In this regard, as described, device 102 can attempt access with base stations excluding base station 104, as it is in the avoidance list and registration is not current. After a period of time with no access, device 102 can cancel the avoidance timer 418 and remove the system from the avoidance list 420, as described previously.

Figure 9:
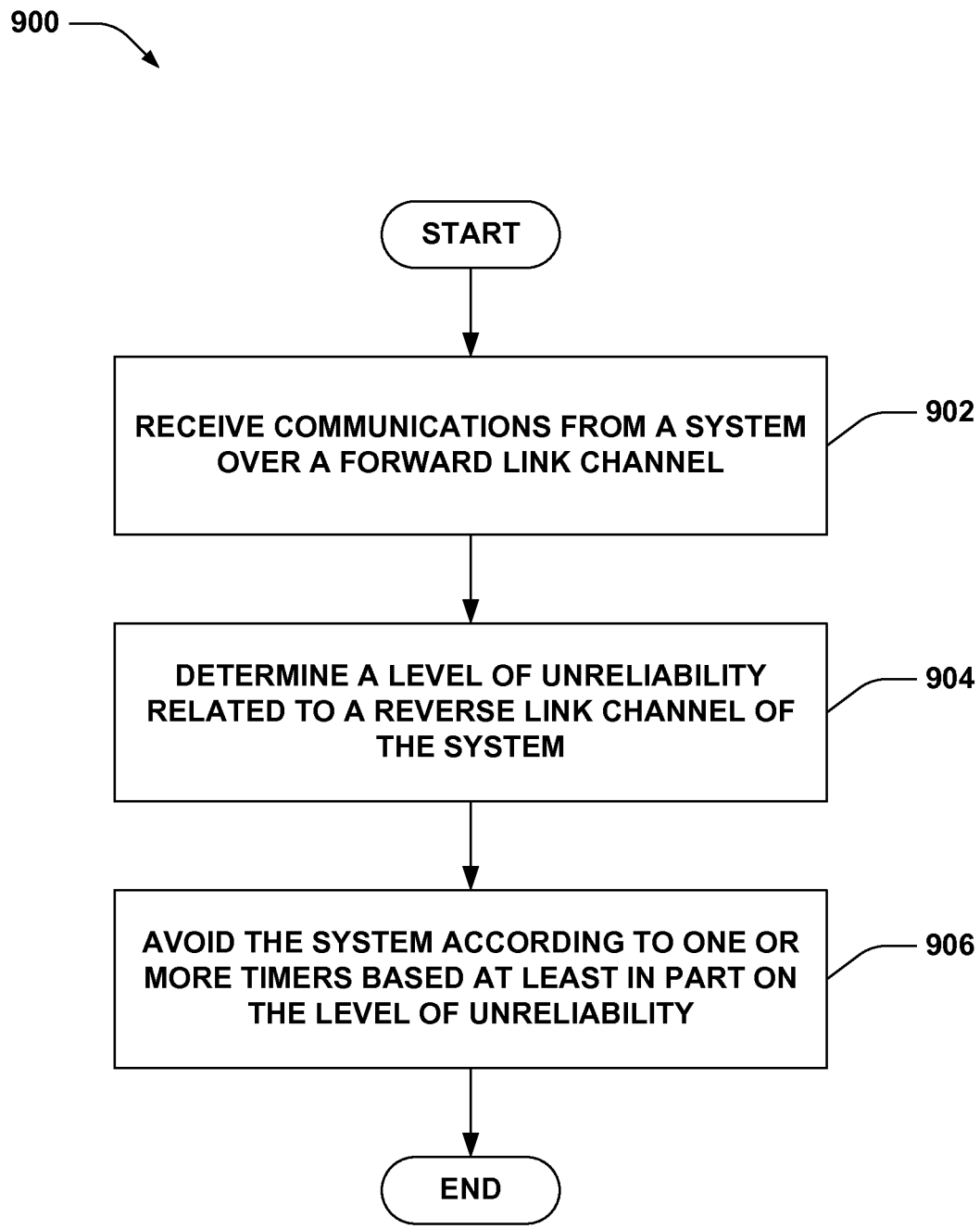
FIG. 9 illustrates an example methodology that facilitates avoiding wireless communication systems based on an unreliable reverse link.
Figure 10:
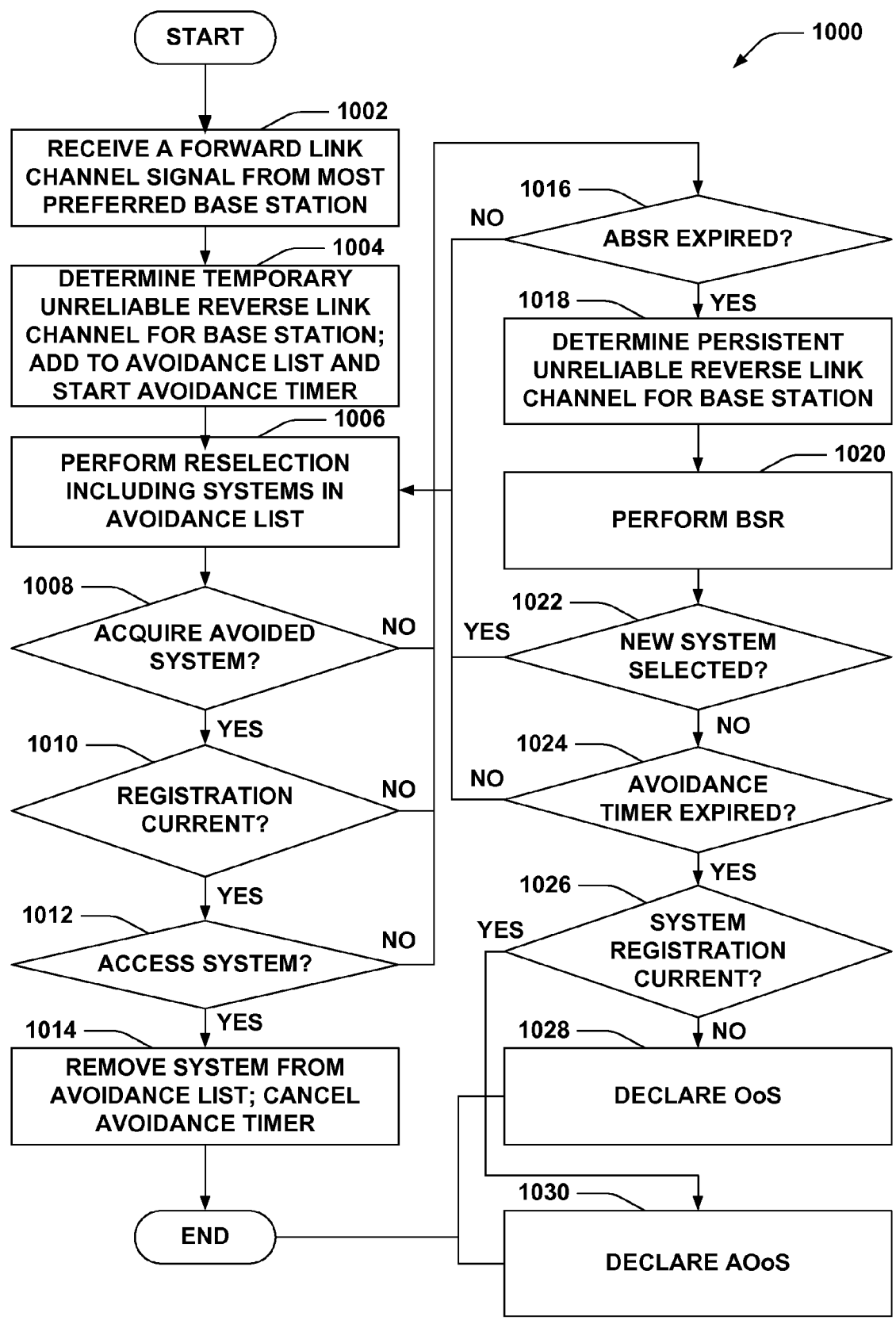
FIG. 10 illustrates an example methodology that avoids wireless communication systems based on determining whether an unreliable reverse link is temporary or persistent.

Referring to FIGS. 9-10, example methodologies relating to avoiding connection attempts to systems in wireless communications are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of inter-related states or events, such as in a state diagram. Moreover, not all illustrated acts may be required to implement a methodology in accordance with one or more embodiments.

Turning to FIG. 9, an example methodology 900 is displayed that facilitates avoiding a system based on a determined level of unreliability. At 902, communications can be received from a system over a forward link channel. As described, the communications can have a high SNR, and the system can be a preferred system to which connection is desired. At 904, a level of unreliability related to a reverse link channel of the system can be determined. As described, for example, the unreliability can include a failed access attempt to the system, insufficient SNR and/or resources related to the reverse link channel, etc. At 906, the system can be avoided according to one or more timers based at least in part on the level of unreliability. Thus, as described in one example, where the unreliability is temporary, the system can be avoided for a smaller portion of time than if persistent. As described herein, various procedures can be performed during the timer when the unreliability is deemed temporary to attempt accessing the avoided system.

Referring to FIG. 10, illustrated is an example methodology 1000 that facilitates avoiding a system when a determined reverse link channel unreliability is temporary or permanent. At 1002, a forward link channel signal can be received from a most preferred base station. At 1004, a temporary unreliable reverse link channel can be determined for the base station, the base station (or related system) can be added to an avoidance list, and an avoidance timer can be started. As described, the unreliability can be based at least in part on an access failure, insufficient resources or quality thereof, etc. At 1006, reselection can be performed including systems in the avoidance list. As described, the reselection can include an OSR for the system (e.g., at least in the first instance of determining the reverse link failure). At 1008, it can be determined whether an avoided system is acquired. If so, at 1010, it can be determined whether registration on the system is current. If so, at 1012, it can be determined whether the system can be accessed (e.g., whether the reverse link channel has sufficient reliability for connection). If so, at 1014, the system can be removed from the avoidance list and the timer can be cancelled.

If the avoided system cannot be acquired at 1008, the registration is not current at 1010, or the system cannot be accessed at 1012, it can be determined whether ABSR is expired at 1016. This can include verifying whether an ABSR timer is expired, whether a configured number of ABSR attempts (e.g., during a BSR period) have been exhausted, and/or the like. If not, reselection can be performed including systems in the avoidance list (e.g., ABSR) at 1006. If ABSR is expired at 1016, it can be determined, at 1018, that the unreliable reverse link channel for the base station is persistent. In this regard, at 1020, BSR can be performed without attempting access to avoided systems. Following the BSR procedure (e.g., whether another system is reselected or whether a BSR timer expires), it can be determined at 1022 whether a new system is selected in the BSR. If so, reselection can be performed including systems in the avoidance list (e.g., so long as the avoidance timer is not expired). If now, it can be determined whether an avoidance timer is expired at 1024. If not, reselection can be performed including systems in the avoidance list at 1006. If not, it can be determined whether system registration is current at 1026. If not, an OoS is declared at 1028, and if so, an AOoS is declared at 1030.

It will be appreciated that, in accordance with one or more aspects described herein, inferences can be made regarding determining whether a reverse link channel is reliable, a level of unreliability, etc., and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 11:
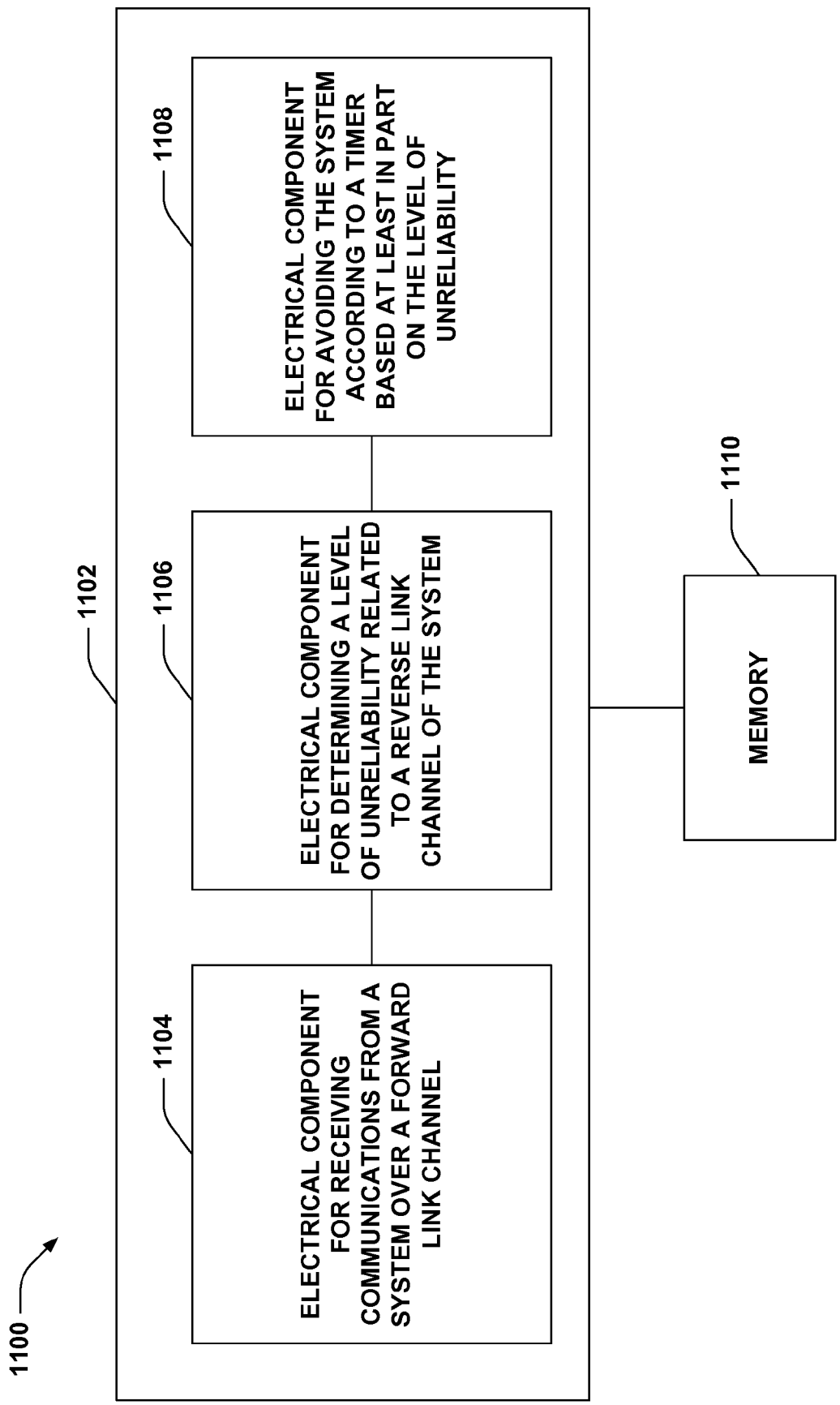
FIG. 11 illustrates an example system for avoiding wireless communication systems based on an unreliable reverse link.

With reference to FIG. 11, illustrated is a system 1100 that avoids a system based at least in part on unreliability of a reverse link channel. For example, system 1100 can reside at least partially within a base station, mobile device, etc. It is to be appreciated that system 1100 is represented as including functional blocks, which can be functional blocks that represent functions implemented by a processor, software, or combination thereof (e.g., firmware). System 1100 includes a logical grouping 1102 of electrical components that can act in conjunction. For instance, logical grouping 1102 can include an electrical component for receiving communications from a system over a forward link channel 1104. As described, for example, the forward link channel can exhibit radio conditions sufficient for receiving further communications from the base station, and thus, connection can be attempted thereto. In this regard, logical grouping 1102 can comprise an electrical component for determining a level of unreliability related to a reverse link channel of the system 1106.

As described, for example, this can be determined based at least in part on attempting access to the base station, and determining whether the reverse link channel has sufficient radio conditions for communicating with the base station. Moreover, logical grouping 1102 can comprise an electrical component for avoiding the system according to a timer based at least in part on the level of unreliability 1108. As described, electrical component 1108 can avoid a system for a period of time based on whether the reverse link channel is temporarily or persistently unreliable. Furthermore, for example, electrical component 1108 can at first assume temporary unreliability and can perform various procedures to determine whether to consider the unreliability to be persistent. Additionally, system 1100 can include a memory 1110 that retains instructions for executing functions associated with the electrical components 1104, 1106, and 1108. While shown as being external to memory 1110, it is to be understood that one or more of the electrical components 1104, 1106, and 1108 can exist within memory 1110.

Figure 12:
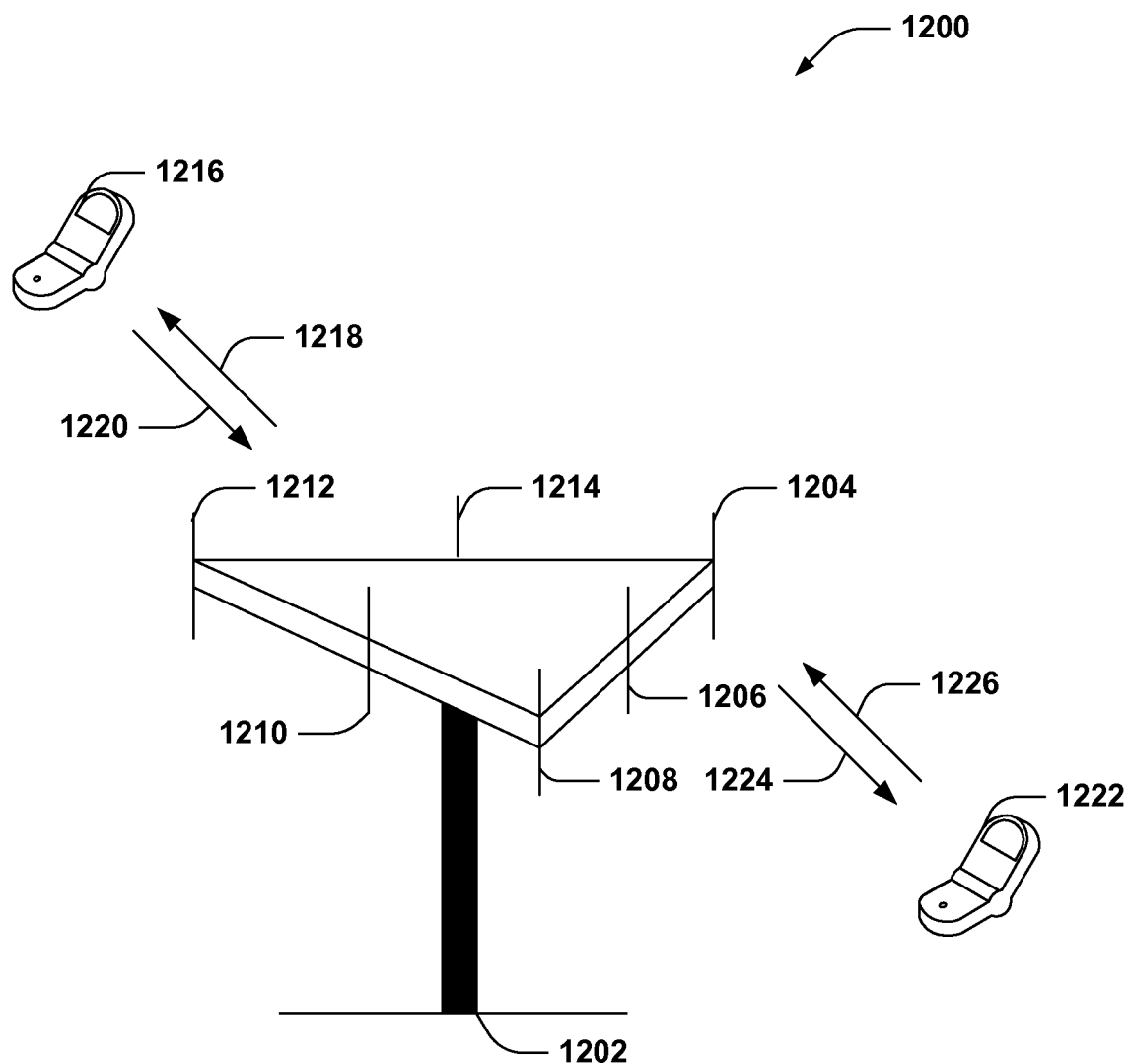
FIG. 12 is an illustration of a wireless communication system in accordance with various aspects set forth herein.

Referring now to FIG. 12, a wireless communication system 1200 is illustrated in accordance with various embodiments presented herein. System 1200 comprises a base station 1202 that can include multiple antenna groups. For example, one antenna group can include antennas 1204 and 1206, another group can comprise antennas 1208 and 1210, and an additional group can include antennas 1212 and 1214. Two antennas are illustrated for each antenna group; however, more or fewer antennas can be utilized for each group. Base station 1202 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1202 can communicate with one or more mobile devices such as mobile device 1216 and mobile device 1222; however, it is to be appreciated that base station 1202 can communicate with substantially any number of mobile devices similar to mobile devices 1216 and 1222. Mobile devices 1216 and 1222 can be, for example, cellular phones, smart phones, laptops, handheld communication devices, handheld computing devices, satellite radios, global positioning systems, PDAs, and/or any other suitable device for communicating over wireless communication system 1200. As depicted, mobile device 1216 is in communication with antennas 1212 and 1214, where antennas 1212 and 1214 transmit information to mobile device 1216 over a forward link 1218 and receive information from mobile device 1216 over a reverse link 1220. Moreover, mobile device 1222 is in communication with antennas 1204 and 1206, where antennas 1204 and 1206 transmit information to mobile device 1222 over a forward link 1224 and receive information from mobile device 1222 over a reverse link 1226. In a frequency division duplex (FDD) system, forward link 1218 can utilize a different frequency band than that used by reverse link 1220, and forward link 1224 can employ a different frequency band than that employed by reverse link 1226, for example. Further, in a time division duplex (TDD) system, forward link 1218 and reverse link 1220 can utilize a common frequency band and forward link 1224 and reverse link 1226 can utilize a common frequency band.

Each group of antennas and/or the area in which they are designated to communicate can be referred to as a sector of base station 1202. For example, antenna groups can be designed to communicate to mobile devices in a sector of the areas covered by base station 1202. In communication over forward links 1218 and 1224, the transmitting antennas of base station 1202 can utilize beamforming to improve signal-to-noise ratio of forward links 1218 and 1224 for mobile devices 1216 and 1222. Also, while base station 1202 utilizes beamforming to transmit to mobile devices 1216 and 1222 scattered randomly through an associated coverage, mobile devices in neighboring cells can be subject to less interference as compared to a base station transmitting through a single antenna to all its mobile devices. Moreover, mobile devices 1216 and 1222 can communicate directly with one another using a peer-to-peer or ad hoc technology as depicted. According to an example, system 1200 can be a multiple-input multiple-output (MIMO) communication system.

Figure 13:
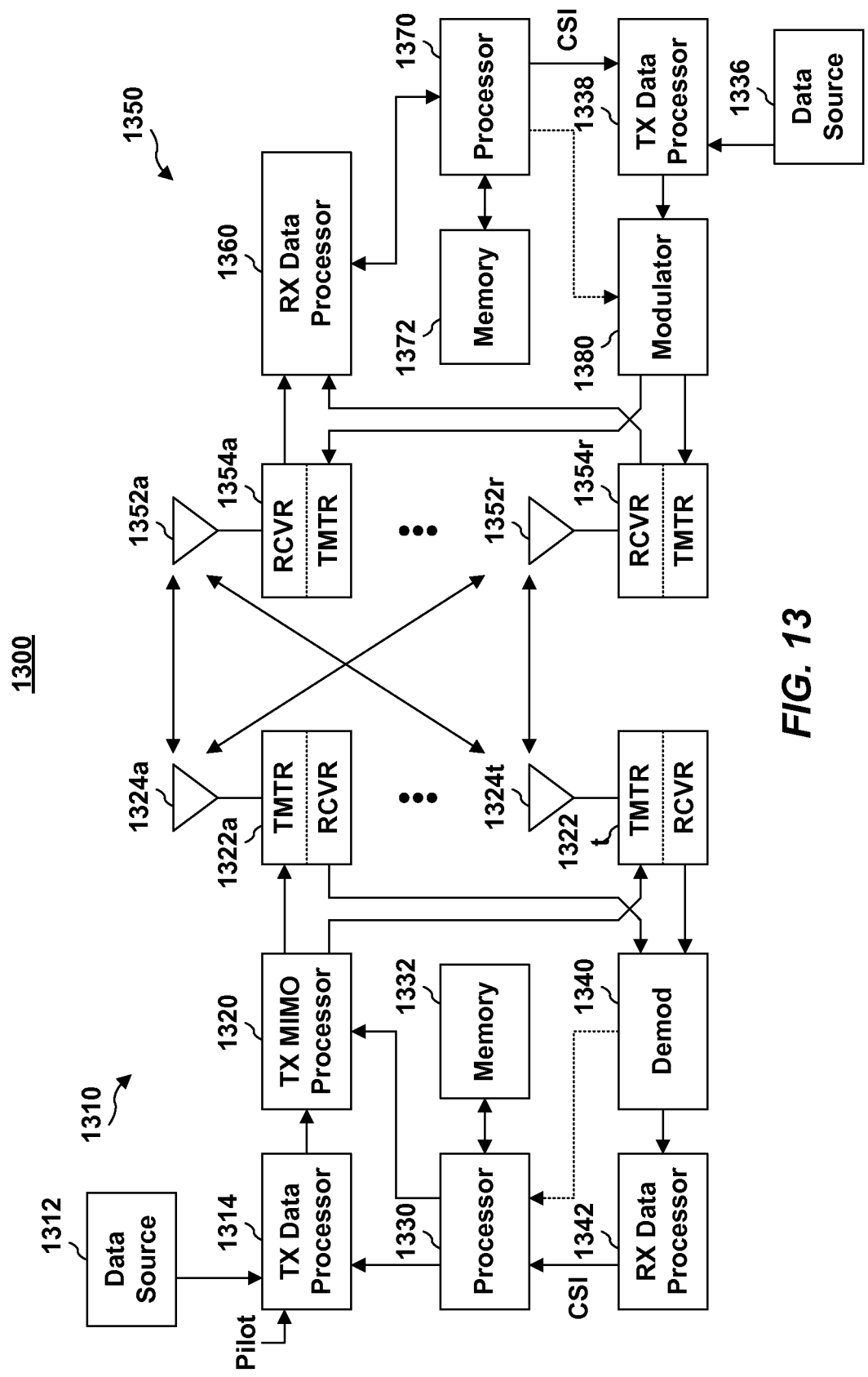
FIG. 13 is an illustration of an example wireless network environment that can be employed in conjunction with the various systems and methods described herein.

FIG. 13 shows an example wireless communication system 1300. The wireless communication system 1300 depicts one base station 1310 and one mobile device 1350 for sake of brevity. However, it is to be appreciated that system 1300 can include more than one base station and/or more than one mobile device, wherein additional base stations and/or mobile devices can be substantially similar or different from example base station 1310 and mobile device 1350 described below. In addition, it is to be appreciated that base station 1310 and/or mobile device 1350 can employ the systems (FIGS. 1-8 and 11-12) and/or methods (FIGS. 9-10) described herein to facilitate wireless communication there between. For example, components or functions of the systems and/or methods described herein can be part of a memory 1332 and/or 1372 or processors 1330 and/or 1370 described below, and/or can be executed by processors 1330 and/or 1370 to perform the disclosed functions.

At base station 1310, traffic data for a number of data streams is provided from a data source 1312 to a transmit (TX) data processor 1314. According to an example, each data stream can be transmitted over a respective antenna. TX data processor 1314 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 1350 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1330.

The modulation symbols for the data streams can be provided to a TX MIMO processor 1320, which can further process the modulation symbols (e.g., for OFDM). TX MIMO processor 1320 then provides NT modulation symbol streams to NT transmitters (TMTR) 1322a through 1322t. In various embodiments, TX MIMO processor 1320 applies beamforming weights to the symbols of the data streams and to the antenna from which the symbol is being transmitted.

Each transmitter 1322 receives and processes a respective symbol stream to provide one or more analog signals, and further conditions (e.g., amplifies, filters, and upconverts) the analog signals to provide a modulated signal suitable for transmission over the MIMO channel. Further, NT modulated signals from transmitters 1322a through 1322t are transmitted from NT antennas 1324a through 1324t, respectively.

At mobile device 1350, the transmitted modulated signals are received by NR antennas 1352a through 1352r and the received signal from each antenna 1352 is provided to a respective receiver (RCVR) 1354a through 1354r. Each receiver 1354 conditions (e.g., filters, amplifies, and downconverts) a respective signal, digitizes the conditioned signal to provide samples, and further processes the samples to provide a corresponding "received" symbol stream.

An RX data processor 1360 can receive and process the NR received symbol streams from NR receivers 1354 based on a particular receiver processing technique to provide NT "detected" symbol streams. RX data processor 1360 can demodulate, deinterleave, and decode each detected symbol stream to recover the traffic data for the data stream. The processing by RX data processor 1360 is complementary to that performed by TX MIMO processor 1320 and TX data processor 1314 at base station 1310.

A processor 1370 can periodically determine which precoding matrix to utilize as discussed above. Further, processor 1370 can formulate a reverse link message comprising a matrix index portion and a rank value portion.

The reverse link message can comprise various types of information regarding the communication link and/or the received data stream. The reverse link message can be processed by a TX data processor 1338, which also receives traffic data for a number of data streams from a data source 1336, modulated by a modulator 1380, conditioned by transmitters 1354a through 1354r, and transmitted back to base station 1310.

At base station 1310, the modulated signals from mobile device 1350 are received by antennas 1324, conditioned by receivers 1322, demodulated by a demodulator 1340, and processed by a RX data processor 1342 to extract the reverse link message transmitted by mobile device 1350. Further, processor 1330 can process the extracted message to determine which precoding matrix to use for determining the beamforming weights.

Processors 1330 and 1370 can direct (e.g., control, coordinate, manage, etc.) operation at base station 1310 and mobile device 1350, respectively. Respective processors 1330 and 1370 can be associated with memory 1332 and 1372 that store program codes and data. Processors 1330 and 1370 can also perform computations to derive frequency and impulse response estimates for the uplink and downlink, respectively.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method of wireless communications, comprising:
   receiving communications from a system over a forward link channel;
   determining a level of unreliability related to a reverse link channel of the system;
   avoiding the system according to one or more timers based at least in part on the level of unreliability; and
   performing one or more reselection procedures including scanning of avoided systems before expiration of at least one of the one or more timers.

2. The method of claim 1, wherein the determining the level of unreliability is based at least in part on determining whether the system is accessed as part of the one or more reselection procedures.

3. The method of claim 2, further comprising acquiring the system as part of the one or more reselection procedures.

4. The method of claim 3, further comprising accessing the system based at least in part on determining that an access attempt can be immediately triggered at the system based at least in part on the acquiring the system.

5. The method of claim 4, further comprising:
   determining the level of unreliability of the reverse link channel is temporary; and
   cancelling at least one of the one or more timers upon accessing the system.

6. The method of claim 3, further comprising continuing to avoid the system based at least in part on determining that an access attempt cannot be immediately triggered at the system.

7. The method of claim 2, further comprising:
   determining the level of unreliability of the reverse link channel is persistent; and
   avoiding the system for a remaining duration of at least one of the one or more timers, wherein the performing the one or more reselection procedures includes performing a threshold number of reselection procedures.

8. The method of claim 7, further comprising adapting the threshold number of reselection procedures based at least in part on historical access attempts to the system.

9. The method of claim 2, further comprising activating an avoided system better service reselection (ABSR) timer for performing at least one of the one or more reselection procedures during one or more better service reselection (BSR) periods based at least in part on determining existence of the system while communicating with a disparate system, determining that a call is released, determining a reselection to the disparate system, or detecting one or more limitations in services offered by the disparate system.

10. The method of claim 1, further comprising initiating an out-of-service procedure, wherein the determining includes determining that the level of unreliability of the reverse link channel is persistent based at least in part on performing a number of reselection procedures without accessing the system.

11. The method of claim 10, further comprising determining that a registration state related to the system is current, wherein the initiating includes initiating an avoided system out-of-service based on the registration state.

12. The method of claim 10, further comprising determining that a registration state related to the system is not current, wherein the initiating includes initiating a system out-of-service that does not scan the system based on the registration state.

13. The method of claim 10, further comprising reinitializing at least one of the one or more timers and attempting access to the system upon expiration of the at least one timer.

14. The method of claim 1, further comprising adapting the one or more timers based at least in part on previous access attempts to the system.

15. An apparatus for avoiding systems, comprising:
   at least one processor configured to:
      receive one or more signals from a system over a forward link channel;
      discern a level of unreliability related to reverse link channel of the system as temporary or persistent;
      avoid the system based at least in part on a timer and the level of unreliability; and
      perform one or more reselection procedures including scanning of avoided systems before expiration of the timer; and
   a memory coupled to the at least one processor.

16. The apparatus of claim 15, wherein the at least one processor discerns the level of unreliability is temporary.

17. The apparatus of claim 16, wherein the at least one processor is further configured to acquire the system as part of the one or more reselection procedures.

18. The apparatus of claim 17, wherein the at least one processor is further configured to:
   access the system based at least in part on determining that an access attempt can be immediately triggered at the system; and
   cancel the timer upon accessing the system based at least in part on discerning the level of unreliability is temporary.

19. The apparatus of claim 16, wherein the at least one processor is further configured to avoid the system for a remaining duration of the timer based at least in part on determining the unreliability is persistent, and the one or more reselection procedures includes a threshold number of reselection procedures.

20. The apparatus of claim 15, wherein the at least one processor is further configured to initiate an out-of-service procedure based at least in part on discerning the unreliability is persistent, and the one or more reselection procedures includes a threshold number of reselection procedures.

21. The apparatus of claim 20, wherein the at least one processor is further configured to determine that a registration state related to the system is current, and the out-of-service procedure is an avoided out-of-service procedure.

22. The apparatus of claim 20, wherein the at least one processor is further configured to reinitialize the timer and attempt access to the system upon expiration of the timer.

23. An apparatus for providing system avoidance, comprising:
  means for receiving communications from a system over a forward link channel;
  means for determining a level of unreliability related to a reverse link channel of the system;
  means for avoiding the system according to a timer based at least in part on the level of unreliability; and
  means for performing one or more reselection procedures including scanning of avoided systems before expiration of the timer.

24. The apparatus of claim 23, wherein the means for determining determines the level of unreliability based at least in part on determining whether the system is accessed as part of the one or more reselection procedures.

25. The apparatus of claim 24, wherein the means for avoiding the system acquires the system as part of the one or more reselection procedures.

26. The apparatus of claim 25, wherein the means for avoiding the system accesses the system based at least in part on determining that an access attempt can be immediately triggered at the system.

27. The apparatus of claim 26, further comprising means for cancelling the timer upon accessing the system, wherein the means for determining determines the level of unreliability of the reverse link channel is temporary.

28. The apparatus of claim 24, wherein the means for determining determines the level of unreliability of the reverse link channel is persistent, and the means for avoiding the system avoids the system for a remaining duration of the timer, wherein the means for performing the one or more reselection procedures performs a threshold number of reselection procedures.

29. The apparatus of claim 23, further comprising means for initiating an out-of-service procedure, wherein the means for determining determines that the level of unreliability of the reverse link channel is persistent based at least in part on performing a number of reselection procedures without accessing the system.

30. The apparatus of claim 29, wherein the means for initiating the out-of-service procedure determines that a registration state related to the system is current, and initiates an avoided system out-of-service based on the registration state.

31. A non-transitory computer-readable medium, comprising:
  code for causing at least one computer to receive one or more signals from a system over a forward link channel;
  code for causing the at least one computer to discern a level of unreliability related to reverse link channel of the system;
  code for causing the at least one computer to avoid the system based at least in part on a timer and the level of unreliability; and
  code for causing the at least one computer to perform one or more reselection procedures including scanning of avoided systems before expiration of the timer.

32. The non-transitory computer-readable medium of claim 31, wherein the code for causing the at least one computer to discern discerns the level of unreliability is temporary.

33. The non-transitory computer-readable medium of claim 32, wherein the computer-readable medium further comprises code for causing the at least one computer to acquire the system as part of the one or more reselection procedures.

34. The non-transitory computer-readable medium of claim 33, wherein the computer-readable medium further comprises:
  code for causing the at least one computer to access the system based at least in part on determining that an access attempt can be immediately triggered at the system; and
  code for causing the at least one computer to cancel the timer upon accessing the system based at least in part on discerning the level of unreliability is temporary.

35. The non-transitory computer-readable medium of claim 32, wherein the computer-readable medium further comprises code for causing the at least one computer to avoid the system for a remaining duration of the timer based at least in part on the code for causing the at least one computer to discern discerning the unreliability is persistent, and the one or more reselection procedures includes a threshold number of reselection procedures.

36. The non-transitory computer-readable medium of claim 31, wherein the computer-readable medium further comprises code for causing the at least one computer to initiate an out-of-service procedure based at least in part on the code for causing the at least one computer to discern discerning the unreliability is persistent, and the one or more reselection procedures includes a threshold number of reselection procedures.

37. The non-transitory computer-readable medium of claim 36, wherein the computer-readable medium further comprises code for causing the at least one computer to determine that a registration state related to the system is current, and the out-of-service procedure is an avoided out-of-service procedure.

38. The non-transitory computer-readable medium of claim 36, wherein the computer-readable medium further comprises code for causing the at least one computer to reinitialize the timer and attempt access to the system upon expiration of the timer.

39. An apparatus for system avoidance, comprising:
  a base station detecting component for receiving communications from a system over a forward link channel;
  a reliability determining component for discerning a level of unreliability related to a reverse link channel of the system;
  a system connecting component for avoiding the system according to a timer based at least in part on the level of unreliability; and
  a reselection component for performing one or more reselection procedures including scanning of avoided systems before expiration of the time.

40. The apparatus of claim 39, wherein the reliability determining component determines the level of unreliability based at least in part on determining whether the system is accessed as part of the one or more reselection procedures.

41. The apparatus of claim 40, wherein the system connecting component acquires the system as part of the one or more reselection procedures.

42. The apparatus of claim 41, wherein the system connecting component accesses the system based at least in part on determining that an access attempt can be immediately triggered at the system.

43. The apparatus of claim 42, further comprising an avoidance timer component for cancelling the timer upon accessing the system, wherein the reliability determining component determines the level of unreliability of the reverse link channel is temporary.

44. The apparatus of claim 40, wherein the reliability determining component determines the level of unreliability of the reverse link channel is persistent, and the system connecting component avoids the system for a remaining duration of the timer, wherein the reselection component performs a threshold number of reselection procedures.

45. The apparatus of claim 39, further comprising an out-of-service component for initiating an out-of-service procedure, wherein the reliability determining component determines that the level of unreliability of the reverse link channel is persistent based at least in part on performing a number of reselection procedures without accessing the system.

46. The apparatus of claim 45, wherein the out-of-service component determines that a registration state related to the system is current and initiates an avoided system out-of-service based on the registration state.

* * * * *